US012603744B2

(12) United States Patent
Zhang et al.

(10) Patent No.: US 12,603,744 B2
(45) Date of Patent: Apr. 14, 2026

(54) METHODS AND APPARATUSES FOR 2-STEP RANDOM ACCESS

(71) Applicant: Lenovo (Beijing) Limited, Beijing (CN)

(72) Inventors: Yuantao Zhang, Dongcheng District (CN); Hongmei Liu, Changping District (CN); Zhi Yan, Xicheng District (CN); Yingying Li, Haidian District (CN); Haiming Wang, Xicheng District (CN)

(73) Assignee: Lenovo (Beijing) Limited, Beijing (CN)

( * ) Notice: Subject to any disclaimer, the term of this patent is extended or adjusted under 35 U.S.C. 154(b) by 495 days.

(21) Appl. No.: 18/041,409

(22) PCT Filed: Sep. 25, 2020

(86) PCT No.: PCT/CN2020/117873
§ 371 (c)(1),
(2) Date: Feb. 12, 2023

(87) PCT Pub. No.: WO2022/061755
PCT Pub. Date: Mar. 31, 2022

(65) Prior Publication Data
US 2023/0309149 A1 Sep. 28, 2023

(51) Int. Cl.
*H04W 74/0838* (2024.01)
*H04L 5/00* (2006.01)
(Continued)

(52) U.S. Cl.
CPC ....... *H04L 5/0051* (2013.01); *H04W 72/1268* (2013.01); *H04W 74/0833* (2013.01); *H04W 74/0836* (2024.01); *H04W 74/0838* (2024.01)

(58) Field of Classification Search
CPC ... H04L 5/0051; H04L 5/0044; H04L 5/0094; H04W 72/1268; H04W 74/0833;
(Continued)

(56) References Cited

U.S. PATENT DOCUMENTS

| | | | | |
|---|---|---|---|---|
| 2021/0329701 | A1* | 10/2021 | Lei | H04W 74/0891 |
| 2023/0180299 | A1* | 6/2023 | Lin | H04W 74/0836 |
| | | | | 370/329 |

FOREIGN PATENT DOCUMENTS

| | | |
|---|---|---|
| CN | 109905221 A | 6/2019 |
| CN | 110536418 A | 12/2019 |

(Continued)

OTHER PUBLICATIONS

PCT/CN2020/117873 , "International Preliminary Report on Patentability", PCT Application No. PCT/CN2020/117873, Apr. 6, 2023, 5 pages.
(Continued)

*Primary Examiner* — Thai Nguyen
(74) *Attorney, Agent, or Firm* — FIG. 1 Patents

(57) ABSTRACT

Disclosed are methods for a RA. One embodiment of the subject application provides a method performed by a user equipment, comprising receiving configurations from a base station, and associating at least one first preamble for a first type of user equipments (UEs) with at least one first physical uplink shared channel (PUSCH) resource unit (PRU) configured for the first type of UEs or at least one unused second PRU configured for a second type of UEs according to at least one of a mapping indication, a mapping ratio, an ordering of the at least one first preamble, an ordering of the at least one unused second PRU or an ordering of the at least one first PRU. Related apparatuses are also disclosed.

20 Claims, 8 Drawing Sheets

(51) Int. Cl.
*H04W 72/1268* (2023.01)
*H04W 74/0833* (2024.01)
*H04W 74/0836* (2024.01)

(58) Field of Classification Search
CPC ......... H04W 74/0836; H04W 74/0838; H04W
74/0891; H04W 72/044
See application file for complete search history.

(56) References Cited

FOREIGN PATENT DOCUMENTS

| | | | |
|---|---|---|---|
| CN | 110719650 | A | 1/2020 |
| CN | 111294937 | A | 6/2020 |

OTHER PUBLICATIONS

PCT/CN2020/117873 , "International Search Report and Written Opinion", PCT Application No. PCT/CN2020/117873, Jun. 22, 2021, 6 pages.

Sony , "Channel Structure for Two-Step RACH", 3GPP TSG RAN WG1 Meeting #98bis, R1-1910743, Chongqing, China [retrieved Jan. 29, 2023]. Retrieved from the Internet <https://www.3gpp.org/ftp/tsg_ran/WG1_RL1/TSGR1_98b/Docs>., Oct. 2019, 4 Pages.

ZTE , "Summary of running MAC CR review issue list", 3GPP TSG-RAN2 Meeting #109-e, R2-2000992, Athens, Greece [retrieved Jan. 29, 2023]. Retrieved from the Internet <https://www.3gpp.org/ftp/tsg_ran/WG2_RL2/TSGR2_109_e/Docs>., Feb. 2020, 64 Pages.

* cited by examiner

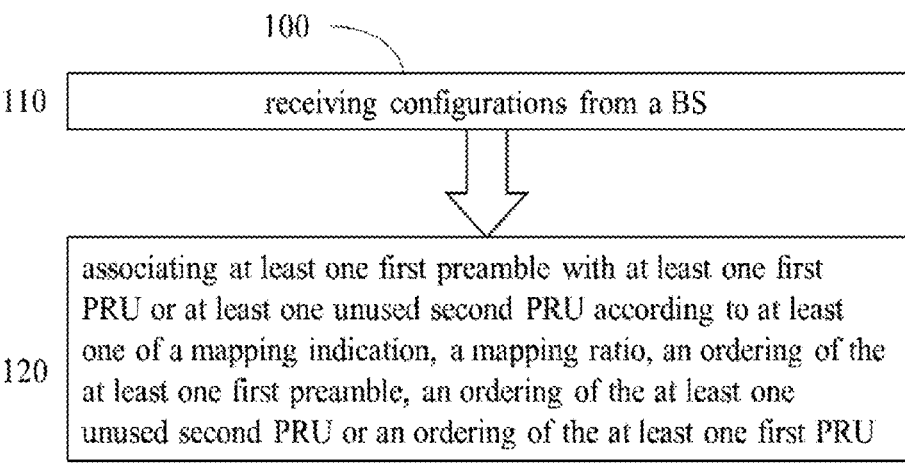

100

110   receiving configurations from a BS 120   associating at least one first preamble with at least one first PRU or at least one unused second PRU according to at least one of a mapping indication, a mapping ratio, an ordering of the at least one first preamble, an ordering of the at least one unused second PRU or an ordering of the at least one first PRU

Figure 1

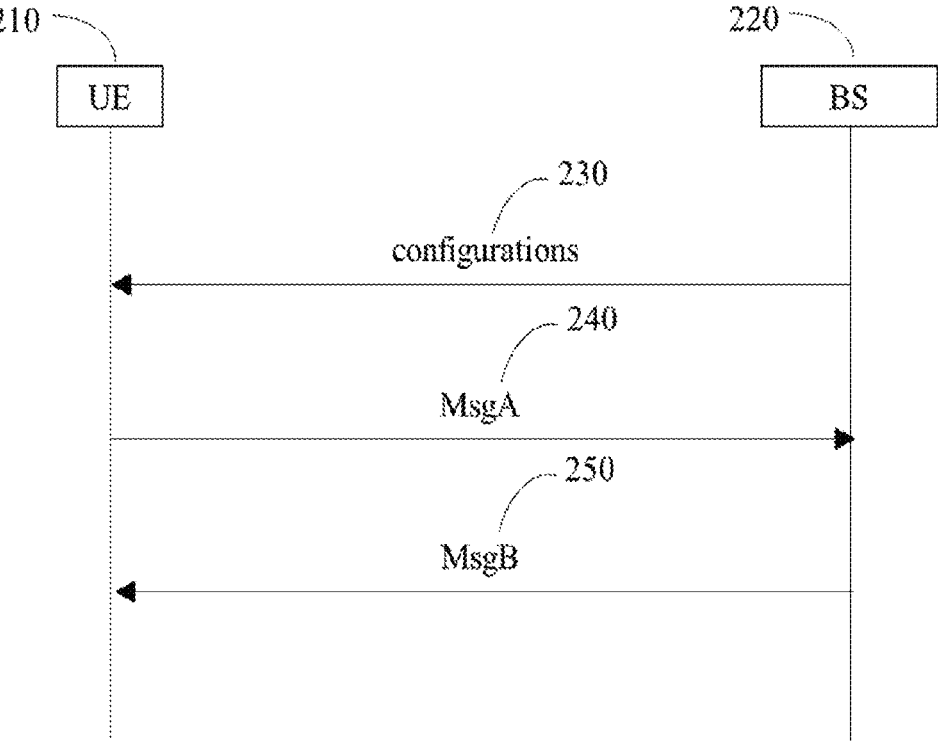

210   UE

220   BS

230 configurations

240

MsgA

250

MsgB

Figure 2

METHODS AND APPARATUSES FOR 2-STEP RANDOM ACCESS

TECHNICAL FIELD

Various exemplary embodiments relate to methods and apparatuses for random accesses.

BACKGROUND OF THE INVENTION

In 3GPP ($3^{rd}$ Generation Partnership Project), in addition to legacy user equipments (UEs), various new types of UEs have emerged, such as industrial wireless sensors, video surveillances, wearables, and etc. Different to the legacy UEs (e.g., enhanced mobile broadband (eMBB) and ultra-reliable low latency communication (URLLC) UEs), these new types of UEs may have the features including e.g., reduced number of receive/transmit antennas, UE bandwidth reduction, half frequency-division duplex, relaxed UE processing time, relaxed UE processing capability, or etc. These new types of UEs can be referred to as reduced capability (RedCap) UEs.

The RedCap UEs may be identified by a base station (BS), such that the BS may perform access control and/or scheduling control, e.g., during a random access (RA) procedure.

SUMMARY

One embodiment of the subject application provides a method performed by a user equipment (UE), comprising receiving configurations from a BS, and associating at least one first preamble for a first type of UEs with at least one first physical uplink shared channel (PUSCH) resource unit (PRU) configured for the first type of UEs or at least one unused second PRU configured for a second type of UEs according to at least one of a mapping indication, a mapping ratio, an ordering of the at least one first preamble, an ordering of the at least one unused second PRU or an ordering of the at least one first PRU.

Another embodiment of the subject application provides a method performed by a BS, comprising sending configurations to a UE, and associating at least one first preamble for a first type of UEs with at least one first PRU configured for the first type of UEs or at least one unused second PRU configured for a second type of UEs according to at least one of the mapping indication, a mapping ratio, an ordering of the at least one first preamble, an ordering of the at least one unused second PRU or an ordering of the at least one first PRU.

A further embodiment of the subject application provides an apparatus, which indicates a non-transitory computer-readable medium having stored thereon computer-executable instructions, a receiving circuitry, a transmitting circuitry, and a processor coupled to the non-transitory computer-readable medium, the receiving circuitry and the transmitting circuitry, wherein the computer-executable instructions cause the processor to implement a method performed by a UE. The method comprises receiving configurations from a BS, and associating at least one first preamble for a first type of UEs with at least one first PRU configured for the first type of UEs or at least one unused second PRU configured for a second type of UEs according to at least one of a mapping indication, a mapping ratio, an ordering of the at least one first preamble, an ordering of the at least one unused second PRU or an ordering of the at least one first PRU.

Another further embodiment of the subject application provides an apparatus, which indicates a non-transitory computer-readable medium having stored thereon computer-executable instructions, a receiving circuitry, a transmitting circuitry, and a processor coupled to the non-transitory computer-readable medium, the receiving circuitry and the transmitting circuitry, wherein the computer-executable instructions cause the processor to implement a method performed by a UE. The method comprises sending configurations to a UE, and associating at least one first preamble for a first type of UEs with at least one first PRU configured for the first type of UEs or at least one unused second PRU configured for a second type of UEs according to at least one of a mapping indication, a mapping ratio, an ordering of the at least one first preamble, an ordering of the at least one unused second PRU or an ordering of the at least one first PRU.

BRIEF DESCRIPTION OF THE DRAWINGS

Some example embodiments will now be described, by way of non-limiting examples, with reference to the accompanying drawings.

FIG. 1 illustrates an exemplary method for a 2-step RA, in accordance with some embodiments of the present disclosure.

FIG. 2 illustrates an exemplary signal sequence for a 2-step RA, in accordance with some embodiments of the present disclosure.

DETAILED DESCRIPTION

Figure 3:
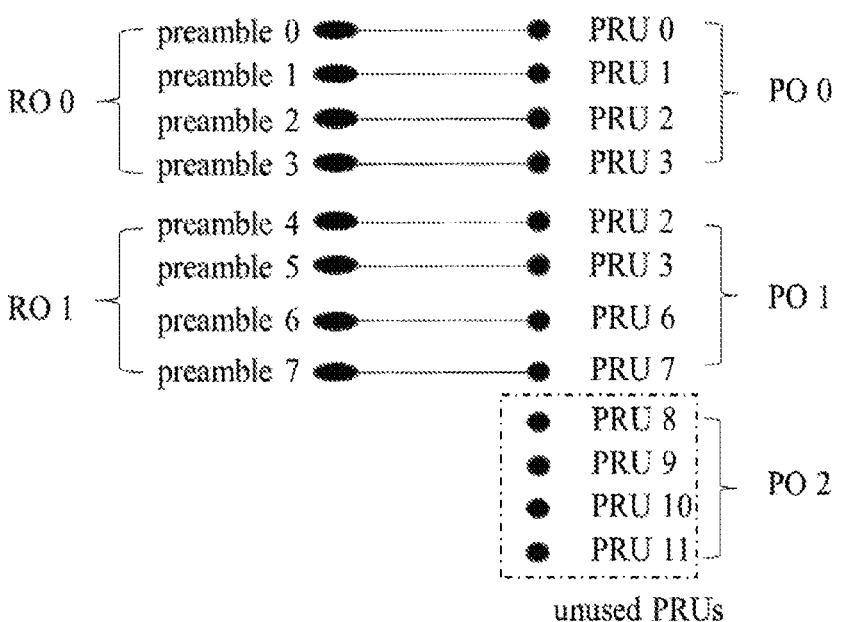
FIG. 3 illustrates an example of unused PRUs in accordance with some embodiments of the present disclosure.

The detailed description of the appended drawings is intended as a description of the preferred embodiments of the present invention, and is not intended to represent the only form in which the present invention may be practiced. It should be understood that the same or equivalent functions may be accomplished by different embodiments that are intended to be encompassed within the spirit and scope of the present invention.

Reference will now be made in detail to some embodiments of the present application, examples of which are illustrated in the accompanying drawings. To facilitate understanding, embodiments are provided under specific network architecture and new service scenarios, such as 3GPP 5G and so on. It is contemplated that along with developments of network architectures and new service scenarios, all embodiments in the present application are also applicable to similar technical problems, and moreover, the terminologies recited in the present application may change, which should not affect the principle of the present application.

The present disclosure generally relates to 2-step RA procedures. A 2-step RA has been specified in 5G and could be configured for radio resource control (RRC) idle/inactive/ connected UEs.

In a 2-step RA procedure, the UE sends a MsgA to the BS. The MsgA has a preamble part and a data part. The preamble part is transmitted in a configured RA occasion (RO), which is corresponding to a specific time-frequency resource. The data part is transmitted in a configured PUSCH occasion (PO), which is also corresponding to a specific time-frequency resource, i.e., a PRU. A PRU for 2-step RACH is associated with a PO and a demodulation reference signal (DMRS) port/DMRS sequence.

In 5G, in addition to the legacy UEs, there may be other various types of UEs, for example, the RedCap UEs. The RedCap UEs may include for example, industrial wireless sensors, video surveillances, wearables, and etc.

The BS may identify these RedCap UEs, and then perform access control and/or scheduling control for these RedCap UEs. Since the RedCap UEs may occupy the same resources that used by the legacy UEs during the RA procedure, the RA performance of the legacy UEs may be adversely affected.

Therefore, it is better that the BS may identify the RedCap UEs as earlier as possible. Once the RedCap UEs are identified, the BS may separate the resources used by the RedCap UEs from the resources used by the legacy UEs, so as to reduce the effect of the RedCap UEs on the legacy UEs.

According to the present disclosure, the BS may configure dedicated preambles for the RedCap UEs for an RA, that is to say, the preambles for the RedCap UEs may be separated from the preambles for the legacy UEs.

Regarding a 2-step RA, according to the present disclosure, the BS may further configure separated physical uplink shared channel (PUSCH) resource units (PRUs) for the RedCap UEs from the PRUs for the legacy UEs. The RedCap UEs may send an MsgA by using a PRU separated from those of the legacy UEs. and a preamble separated from those of the legacy UEs.

On the other hand, according to the present disclosure, the BS may configure the RedCap UEs to use the legacy PRUs not used by the legacy UEs, so that the RedCap UEs may not occupy the PRU resources used by the legacy UEs.

In this way, when a RedCap UE sends a MsgA to the BS during a 2-step RA, it does not occupy the preamble resources and PRU resources used by the legacy UEs, so that the effect of the RedCap UEs on the legacy UEs may be reduced during a RA. Furthermore, the BS may identify the RedCap UE earlier, in another word, the BS may identify the RedCap UE upon receiving the MsgA, which makes it feasible for the BS to reduce the impact of the RedCap UEs on the legacy UEs earlier.

FIG. 1 illustrates an exemplary method 100 performed by a UE to perform a 2-step RA according to the present disclosure.

As shown in FIG. 1, the method 100 may at least include an operation 110 of receiving configurations for at least one first preamble for a first type of UEs, at least one first PRU for the first type of UE, or at least one second PRU for a second type of UEs, and an operation 120 of associating the at least one first preamble with the at least one first PRU configured for the first type of UEs or the at least one second PRU configured for the second type of UEs according to at least one of a mapping indication, a mapping ratio, an ordering of the at least one first preamble, an ordering of the at least one unused second PRU or an ordering of the at least one first PRU; wherein, the mapping ratio is a positive integer and is for the first type of UEs within a configured association pattern period, hereinafter the mapping ratio for the first type of UEs is referred as $R_1$. The mapping ratio $R_1$ means that each $R_1$ consecutive first preambles are associated with a PRU (a first PRU or an unused second PRU) within a configured association pattern period.

In some embodiments, the mapping indication is received from a base station and indicates associating the at least one first preamble with the at least one first PRU or at least one unused second PRU. If a UE of the first type receives the mapping indication, the UE may associate the first preambles to the first PRUs or the unused second PRUs according to the mapping indication.

In some embodiments, the first type of UEs are RedCap UEs, or a specific type of RedCap UEs, and the second type of UEs are legacy UEs, such as eMBB UEs, URLLC UEs and any other type UEs before RedCap UEs are introduced.

In some embodiments, the association is for associating at least one first preamble with at least one unused second PRU. The unused second PRU means a PRU that is configured for the second type of UEs but is not used by the second type of UEs.

In some embodiments, the association is for associating at least one first preamble with at least one first PRU, the BS further configures the at least one first PRU, which is separated from the at least one second PRU for the second type of UEs.

For example, for associating the at least one first preamble with the at least one first PRU, the mapping ratio $R_1$ is determined by the number of the at least one first preamble and the number of the at least one first PRU. In some embodiments, the mapping ratio can be determined by the equation below:

$$R_1 = \text{ceil}\left(\frac{N_{preamble\_1}}{N_{pru\_1}}\right) \qquad \text{(equation 1)}$$

Wherein the number $N_{preamble\_1}$ is the total number of first preambles for the first type of UEs, and the number $N_{pru\_1}$ is the total number of first PRUs for the first type of UEs.

Since the mapping ratio $R_1$ determined by equation 1 is a positive integer, in some embodiments, some first PRUs are not used by the first type of UEs, these PRUs are referred as unused first PRUs.

For example, for associating the at least one first preamble with the at least one unused second PRU, the mapping ratio $R_1$ is determined by the number of the at least one first preamble and the number of the at least one unused second PRU, wherein the unused second PRU means a PRU that is configured for the second type of UEs but is not used by the second type of UEs. In some embodiments, the mapping ration $R_1$ can be determined by the equation below:

$$R_1 = \text{ceil}\left(\frac{N_{preamble\_1}}{N_{pru\_2\_unused}}\right) \qquad \text{(equation 2)}$$

Wherein the number $N_{preamble\_1}$ is the total number of first preambles for the first type of UEs, and the number $N_{pru\_2\_unused}$ unused is the total number of unused second PRUs.

Since the mapping ratio $R_1$ determined by equation 2 is a positive integer, in some embodiments, some unused second PRUs are still not used by the first type of UEs, in another word, these unused second PRUs are not associated with any first preambles.

FIG. 2 illustrates an exemplary signal sequence of a 2-step RA procedure according to the method 100.

As shown in FIG. 2, the BS 220 may transmit configurations 230 to the UE 210. The configurations are for configuring at least one first preamble for a first type of UEs, at least one first PRU for the first type of UE, or at least one second PRU for a second type of UEs. In a 2-step RA, the UE 210 sends an MsgA 240 to the BS 220, and the BS 220 may send an MsgB 250 to the UE 210, the MsgB 250 is a response message for the MsgA 240. In some embodiments, the configurations 230 is sent in the SIB1. In some embodiments, a mapping indication is included in the configurations 230, which configures UE if associating the first preambles to the first PRUs, when the first PRUs is configured, or associating the first preambles to the second PRUs that are configured for the second type of UEs but may or may not be used by the second type of UEs.

In some embodiments, the BS 220 may be referred to as an access point, an access terminal, a base, a base unit, a macro cell, a Node-B, an evolved Node B (eNB), a generalized NodeB (gNB), a Home Node-B, a relay node, or a device, or described using other terminology used in the art.

In some embodiments, the at least one first preamble, the at least one second preamble, the at least one second PRU, and the at least one first PRU if existed, are broadcasted in the SIB1.

FIG. 3 illustrates examples of such unused second PRUs that are configured for the second type of UEs but not used by the second type of UEs.

Regarding the example shown in FIG. 3, the BS configures two ROs and 3 POs for the second type of UEs, and configures 4 second preambles per RO and 4 second PRUs per PO for the second type of UEs. Accordingly, the number of the second preambles is 8, the number of the second PRUs is 12.

In some embodiments, the BS may flexibly configure one-to-one or multiple-to-one mapping between the second preambles and the second PRUs considering tradeoff between the collision rate and the resource occupation. In some embodiments, the mapping ratio is determined by the number of preambles and the number of PRUs configured in the association period.

In this example, the mapping ratio $R_2$ for the second type of UEs is 1, i.e., each second preamble is associated with a second PRU, wherein the mapping ratio $R_2$ is a positive integer and means that each $R_2$ consecutive second preambles are associated with a second PRU within a configured association pattern period.

Accordingly, there are 4 unused second PRUs (i.e., PRU 8~PRU 11). These four unused second PRUs belong to the PO 2, and the PO 2 has no PRUs used by the second type of UEs; therefore the PO 2 is unused for the second type of UEs.

Figure 4:
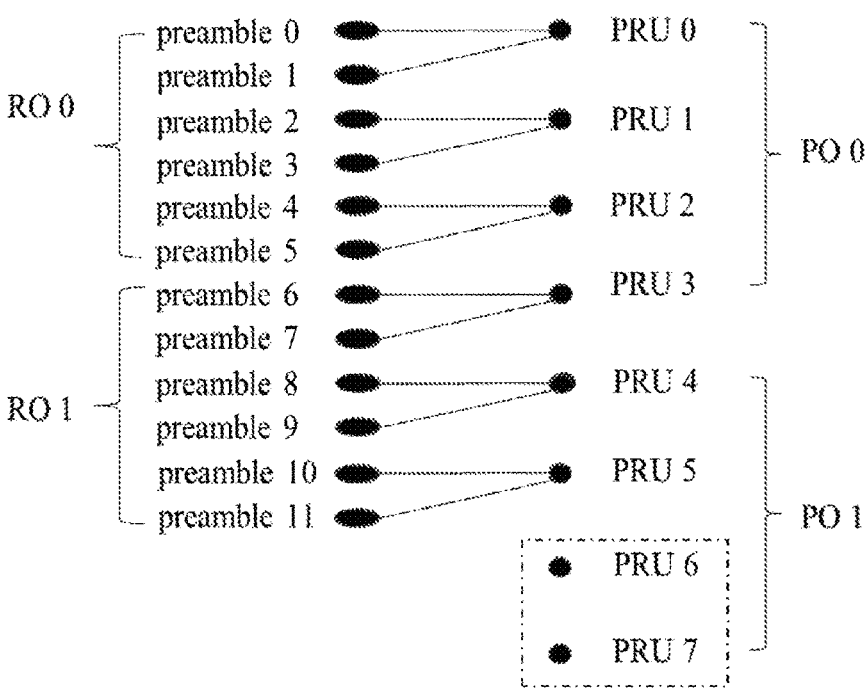
FIG. 4 illustrates an example of unused PRUs in accordance with some embodiments of the present disclosure.

Regarding the example shown in FIG. 4, the BS configures two ROs and two POs for the second type of UEs, and configures 6 second preambles per RO and 4 second PRUs per PO for the second type of UEs. Accordingly, the number of the second preambles is 12, and the number of the second PRUs is 8. In this example, the mapping ratio $R_2$ to be 2, i.e., every two second preambles are associated with one second PRU. Therefore, there are two unused second PRUs (i.e., PRU 6 and PRU 7) which belong to the PO 1, wherein the PO 1 has the second PRU 4 and the second PRU 5 used by the second type of UEs.

In some embodiments, the configuration 230 includes a number of at least one DMRS symbol, at least one index of at least one code-division multiplexing (CDM) group, at least one index of at least one antenna port per CDM group, and a number of at least one DMRS sequence.

For example, up to 2 DMRS symbols may be used for the first PRU. In the configuration 230, if the number of at least one DMRS symbol is 1, it means that 1-symbol DMRS is used; and if the number of at least one DMRS symbol is 2, it means that 2-symbol DMRS is used.

For example, up to 2 CDM groups may be used for the first PRU. In the configuration 230, if the at least one index of the at least one CDM group is set be 0, it means that the CDM group 0 is used for the first PRUs; if the index of the CDM group is set to be 1, it means that the CDM group 1 is used for the first PRUs; and if the index of the CDM group is absent, it means that both the two CDM groups are used for the first PRUs.

For example, the number of the antenna ports per CDM group is up to 4. The antenna ports associated with CDM group 0 are antenna ports 0, 1, 4, and 5; and the antenna ports associated with CDM group 1 are antenna ports 2, 3, 6, and 7.

For example, the configuration 30 directly indicates that the antenna port 4 associated with CDM group 0 and the antenna port 6 associated with CDM group 1 are used for the first PRUs, no matter whether these two antenna ports are used by the second type of UEs in second PRUs.

For example, in the configuration 230, the number of at least one DMRS sequence may be 1 or 2. If the number of at least one DMRS sequence is 1, it means that one DMRS sequence is used; and if the number of at least one DMRS sequence is 2, it means that two DMRS sequences are used.

In some embodiments, the configuration 230 does not include the at least one index of the at least one antenna port per CDM group, it includes a number of at least one antenna port per CDM group, in addition to the number of at least one DMRS symbol, the at least one index of the at least one code-division multiplexing (CDM) group, and the number of at least one DMRS sequence. Furthermore, in some embodiments, the configuration 230 further indicates whether these antenna ports per CDM group are shared with the second type of UEs. If the antenna ports are not shared with the second type of UEs, and if the resource is enough, the advantage is to further decrease the effect of the first type of UEs on the second type of UEs. In some embodiment, the configurations of at least one DMRS symbol, at least one index of at least one CDM group, and a number of at least one DMRS sequence are shared for the first type of UEs and the second type UEs. The first type of UEs may follow these configurations, if they have been configured for the second type UEs.

For example, in the configuration 230, if the number of the at least one antenna port per CDM group is 2, and the index of CDM group is 1, it means that two of the antenna ports 2, 3, 6, and 7 associated with CDM group 1 are used for the dedicated PRUs.

In some embodiments, the antenna ports per CDM group for the first type of UEs may be selected from low to high according to the indexes of the antenna ports per CDM group; thus, the antenna ports 2 and 3 associated with CDM group 1 may be selected for the first PRUs.

For example, if the configuration 230 further indicates that these antenna ports may be shared with the second type of UEs, the antenna ports 2 and 3 may be selected to be associated with CDM group 1. If the configuration 230 further indicates that these antenna ports are not shared with the second type of UEs, and if the antenna ports 2 and 3 are used for the second type of UEs, then the antenna ports 6 and 7 are selected for the first PRUs.

For example, if the configuration further indicates that the two antenna ports are not shared with the second PRUs, and if the antenna port 2 is used for the second type of UEs, then the antenna ports 3 and 6 are selected for the first PRUs.

In some embodiments, the mapping ratio $R_1$ can be identical to the mapping ratio $R_2$. In some embodiments, the mapping ratio $R_1$ can be different from the mapping ratio $R_2$.

In some embodiments, the at least one first preamble for the first type of UEs are ordered together with the at least one second preamble for the second type of UE.

In some embodiments, the at least one index of the at least one first preamble can be greater than the at least one index of the at least one second preamble. For example, if the total number of the second preambles is $N_{preamble\_2}$, the second preambles can be ordered as $0, 1, \ldots, N_{preamble\_2}-1$, and the first preambles can be ordered as $N_{preamble\_2}, N_{preamble\_2}+1$, $N_{preamble\_2}+N_{preamble\_1}-1$. The advantage is to avoid the first PRUs to overlap on the second PRUs.

In some embodiments, the at least one first preamble has an index equal to the at least one index of the at least one second preamble plus an offset $N_{offset}$, wherein the offset $N_{offset}$ is an integer equal to or greater than zero. For example, if the total number of the second preambles is $N_{preamble\_2}$ and the total number of the first preambles is $N_{preamble\_1}$, then the second preambles can be ordered as $0, 1, \ldots, N_{preamble\_2}-1$, and the first preambles can be ordered as $N_{preamble\_2}+N_{offset}, N_{preamble\_2}+N_{offset}+1, \ldots, N_{preamble\_2}+N_{offset}+N_{preamble\_1}-1$. In some scenarios where the first preambles are associated with the unused second PRUs, a reasonable $N_{offset}$ may associate the first preamble to the POs for the second type of UEs, wherein these POs have no PRUs used by the second type of UEs, then the first type of UEs may not affect the DMRS performance of the second type of UEs.

In some embodiments, the first preambles for the first type of UEs can be ordered separately from the second preamble for the second type of UEs. For example, the first preambles can be ordered as $0, 1, \ldots, N_{preamble\_1}-1$, and the second preambles can be ordered as $0, 1, \ldots, N_{preamble\_2}-1$.

In some embodiments, for associating the first preambles to the unused second PRUs, the indexes of the unused second PRUs are greater than the indexes of the second PRUs used by the second type of UEs.

In some embodiments, for associating the first preambles to the first PRUs, the first PRUs for the first type of UEs are ordered together with the second PRUs for the second type of UE.

In some embodiments, the at least one index of the at least one first PRU is greater than the at least one index of the at least one second PRU. For example, if the total number of the second PRUs are $N_{pru\_2}$, the second PRUs can be ordered as $0, 1, \ldots, N_{pru\_2}-1$, and the first PRUs are ordered as $N_{pru\_2}, N_{pru\_2}+1, \ldots, N_{pru\_2}+N_{pru\_1}-1$. In some embodiments, the second PRUs include at least one unused second PURs.

In some embodiments, the first PRUs for the first type of UEs are ordered separately from the second PRUs for the second type of UEs. For example, the first preambles are ordered as $0, 1, \ldots, N_{pru\_1}-1$.

In some embodiments, the ordered first preambles map to the ordered unused second PRUs sequentially based on the mapping ratio $R_1$. In some embodiments, the mapping starts from the first one of the unused second PRUs. In some embodiments, the mapping starts from the first one of the unused second PRUs plus an offset.

Several embodiments are provided below to better explain the technical solution of the present disclosure.

Figure 5:
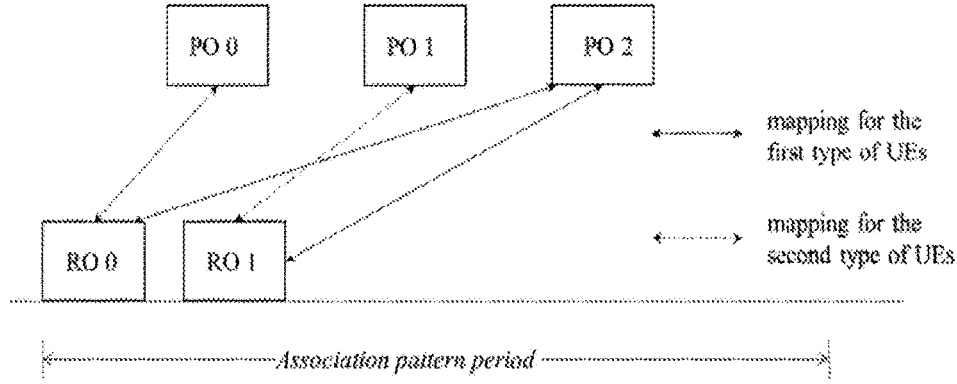
FIG. 5 illustrates an exemplary resource configuration.

FIG. 5 illustrates an example about the ROs and the POs configured by the BS within an association pattern period.

As shown in FIG. 5, there are two ROs (i.e., RO 0 and RO 1) and three POs (i.e., PO 0, PO 1, and PO 2) configured within the association pattern period. For 2-step RA, the BS configures first preambles for the first type of UEs per RO, and configures second preambles and second PRUs for the second type of UEs per RO. The association is for associating the first preambles to the second PRUs unused by the second type of UEs. Referring to FIG. 5, the dotted line with double arrows indicates the association between the second preambles and the second PRUs for the second type of UEs, and the solid line with double arrows indicates the association between the first preambles and the unused second PRUs for the first type of UEs.

In some embodiment, as shown in FIG. 5, to avoid the interference of the first type of UEs to the second type of UEs on the DMRS performance, it is better to use the unused second PRUs of the same PO that has no second PRUs used by the second type of UEs.

Figure 6:
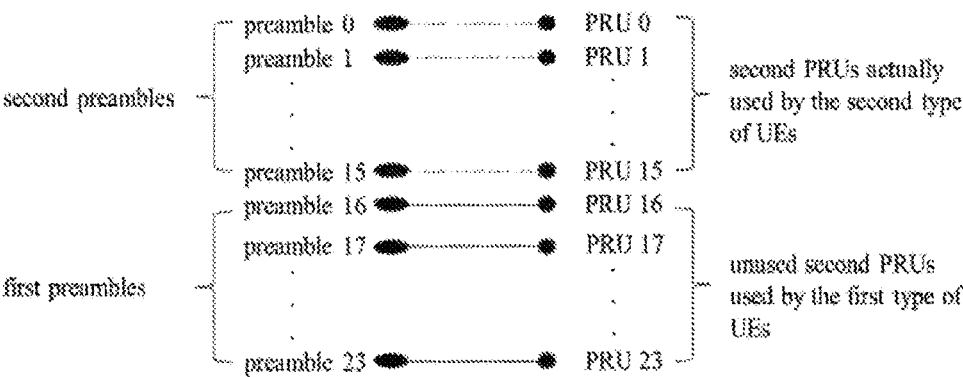
FIG. 6 illustrates an exemplary mapping for 2-step RA, in accordance with some embodiments of the present disclosure.

For example, please refer to FIG. 6, there are 4 first preambles and 8 second preambles per RO, and there are 8 second PRUs per PO. The total number $N_{preamble\_1}$ of the first preambles is 8, and the total number $N_{preamble\_2}$ of the second preambles is 16. The first preambles are ordered together with the second preambles, the second preambles are ordered as $0, 1, \ldots, 15$, and the first preambles are ordered as $16, 17, \ldots, 23$.

The total number $N_{pru\_2}$ the second PRUs is 24. The second PRUs of ofthe PO 0 are numbered as $0, 1, \ldots, 7$, the second PRUs of the PO 1 are numbered as $8, 9, \ldots, 15$, and the second PRUs of the PO 2 are numbered as $16, 17, \ldots, 23$.

The mapping ratio $R_2$ is determined to be 1. There are 8 unused second PRUs (i.e., the PRUs $16, 17, \ldots, 23$) left,

9 the number $N_{pru\_2\_unused}$ equals to 8, and they belong to the PO 2 that has no second PRUs used by the second type of UEs.

Since the PO does not have any second PRU actually used by the second type of UEs, $N_{offset}$ is set to be 0.

In this example, for associating the first preambles with the unused second preambles, the total number $N_{preamble\_1}$ is 8 which equals to the number $N_{pru\_2\_unused}$ of the unused second PRUs; therefore, the mapping ratio $R_1$ is 1.

Figure 7:
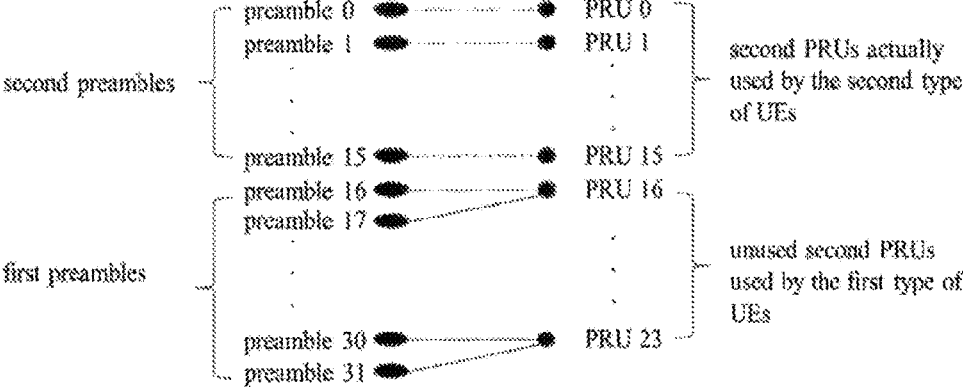
FIG. 7 illustrates an exemplary mapping for 2-step RA, in accordance with some embodiments of the present disclosure.

For example, please refer to FIG. 7, there are 8 first preambles and 8 second preambles per RO, and there are 8 second PRUs per PO. The total number $N_{preamble\_1}$ of the first preambles is 16, and the total number $N_{preamble\_2}$ of the second preambles is 16. The first preambles are ordered together with the second preambles, i.e., the second preambles are ordered as 0, 1, . . . , 15, and the first preambles are ordered as 16, 17, . . . , 31.

The total number $N_{pru\_2}$ of the second PRUs is 24. The second PRUs of the PO 0 are numbered as 0, 1, . . . , 7, the second PRUs of the PO 1 are numbered as 8, 9, . . . , 15, and the second PRUs of the PO 2 are numbered as 16, 17, . . . , 23.

The mapping ratio $R_2$ is determined to be 1. Therefore, there are 8 unused second PRUs left, i.e., $N_{pru\_2\_unused}$ equals to 8. In this example, these 8 unused second PRUs are the PRUs 16, 17, . . . , 23, and they belong to the PO 2 which has no second PRUs used by the second type of UEs.

Since the PO 2 does not have any second PRU actually used by the second type of UEs, $No_{offset}$ is set to be 0.

In this example, for associating the first preambles with the unused second preambles, the total number $N_{preamble\_1}$ is 16 and is double of the number $N_{pru\_2\_unused}$ of the unused second PRUs; therefore, the mapping ratio $R_1$ is 2.

Figure 8:
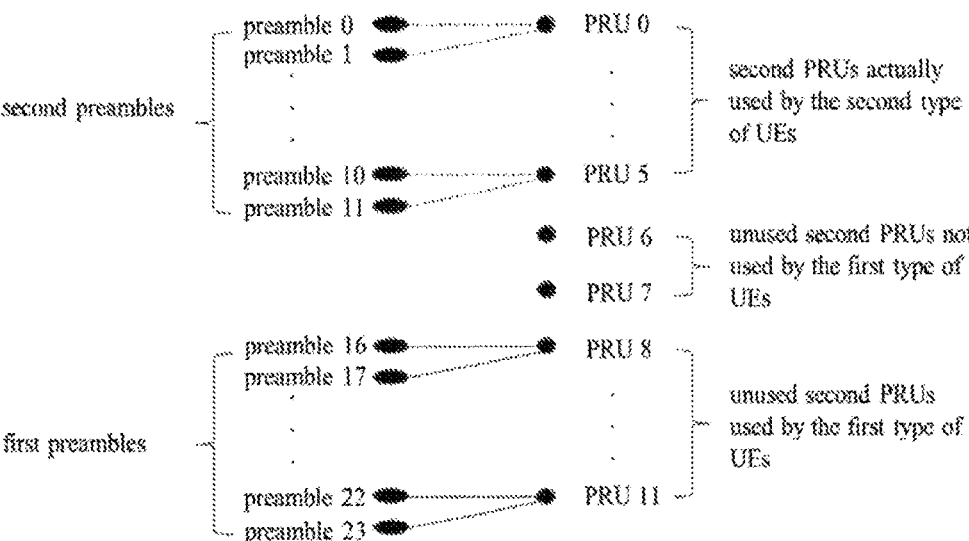
FIG. 8 illustrates an exemplary mapping for 2-step RA, in accordance with some embodiments of the present disclosure.

For example, please refer to FIG. 8, there are 4 first preambles and 6 second preambles per RO, and there are 4 second PRUs per PO. The total number $N_{preamble\_1}$ of the first preambles is 8, and the total number $N_{preamble\_2}$ of the second preambles is 12. The first preambles are ordered together with the second preambles, i.e., the second preambles are ordered as 0, 1, . . . , 11, and the first preambles are ordered as 16, 17, . . . , 23, i.e., the ordering of the first preambles are greater than the ordering of the second preambles.

In this example shown in FIG. 8, the total number $N_{pru\_2}$ of the second PRUs is 12. The mapping ratio $R_2$ is determined to be 2, i.e., the second preambles 0-11 are associated with the second PRUs 0-5.

The second PRUs unused by the second preambles are PRUs 6-11, wherein PRU 6 and PRU 7 belong to the PO 1, and PRUs 8-11 belong to the PO 2. The total number $N_{pru\_2\_unused}$ of the second PRUs not used by the second type of UEs is 6.

In this example, the association is for associating the first preambles with the unused second preambles. The total number $N_{preamble\_1}$ is 8, the mapping ratio $R_1$ is 2.

Accordingly, only 4 of the 6 unused second PURs by the second type of UEs are associated with the 8 first preambles. The PRU 6 and the PRU 7 are unused second PRUs and they are not used by the first type of UEs either.

One operation is to select the PRUs 8-11 for associating with the first preambles. The PRUs 8-11 belong to the PO 3 which has no second PRU used for the second type of UEs. In this way, the interference of the first type of UEs to the second type of UE on the DMRS may be avoided as much as possible. If PRUs 6 and 7 are selected to be associated with the first preambles, there may be DMRS interference of the first type of UEs to the second type of UEs.

In this example, the PRUs 8-11 are used to be associated with the first preambles, and the PRU 6 and the PRU 7 are not used by the first type of UEs and the second type of UEs.

In the example shown in FIG. 8, the first preambles are ordered together with the second preambles. Although the unused second PURs (i.e., PRU 6 and the PRU 7) are not used by the first type of UEs, when ordering the preambles of the first type of UEs, these two unused second PRUs are still needed to be considered; the advantage is to avoid the first PRUs to overlap on the second PRUs. The offset $N_{offset}$ is determined by the equation:

$$N_{offset}=\text{(the number of the second PRUs not used by}$$
$$\text{both the first type of UEs and the second type}$$
$$\text{of UEs*}R_2) \qquad \text{(equation 3)}$$

In this example, the number of the second PRUs not used by both two types of UEs is 2, the mapping ratio $R_2$ is 2, therefore, the offset $N_{offset}$ is set to be 2*2, i.e., the second preambles are ordered as 0, 1, 2, . . . , 11, and the first preambles are ordered as 16, 17, 18, . . . , 23.

According to the example shown in FIG. 8, not all the used second PRUs are used by the first type of UEs. The second PRUs actually used by the second type of UEs is 6, the second PRUs actually used by the first type of UEs is 4, the sum of these two numbers is less than the total number 12 of the second PRUs.

Figure 9:
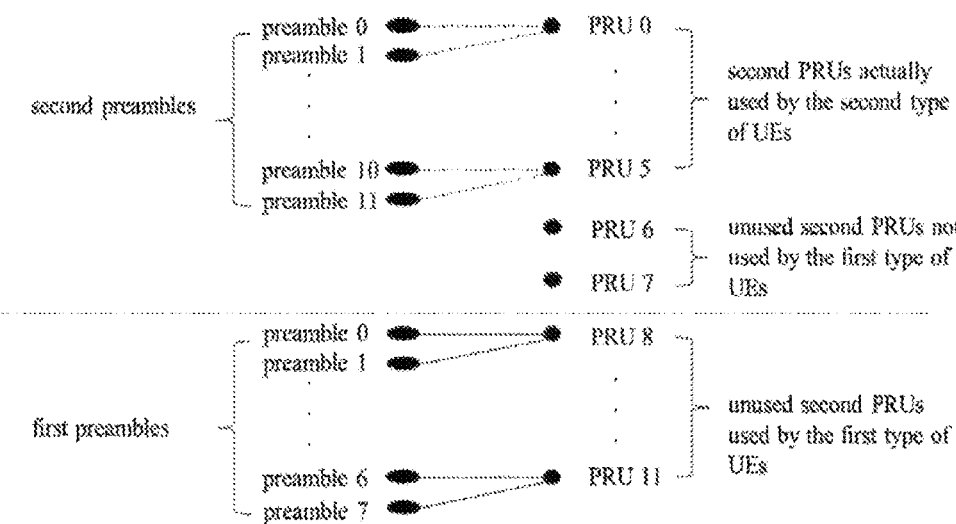
FIG. 9 illustrates an exemplary mapping for 2-step RA, in accordance with some embodiments of the present disclosure.

Furthermore, the first preambles may be ordered separately from the second preambles. For example, as shown in FIG. 9, the first preambles 16, 17, . . . , 23 shown in FIG. 8 may be ordered as preambles 0, 1, . . . , 7. And the first preamble for the first type of UEs is mapped to an unused second PRU (i.e. PRU#8) which is gotten by adding an offset (i.e. 2) to the first unused second PRU (i.e., PRU#6) for the second type UE. In this case, the offset $N_{offset}$ is not considered.

Figure 10:
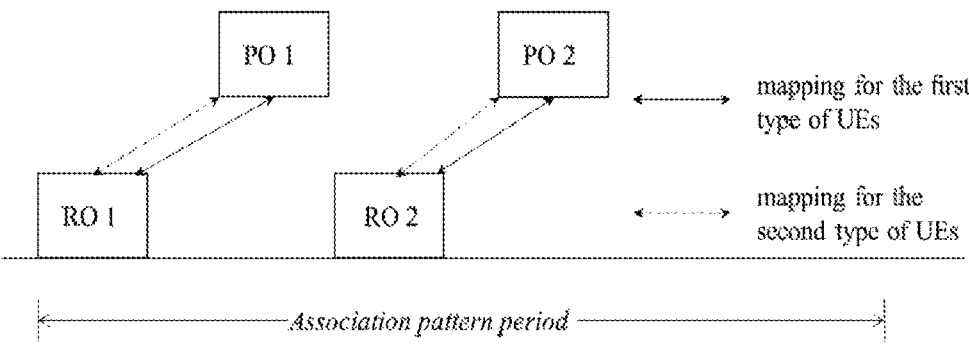
FIG. 10 illustrates an exemplary resource configuration.

FIG. 10 illustrates an example about the ROs and the POs configured for 2-step RAs within an association pattern period.

In this example, the BS configures first preambles and the second preambles per RO, and configures first PRUs and second PRUs per PO. The second preambles are associated with the second PRUs for the second type of UEs. The association is for associating the first preambles to the first PRUs, in another word, the first preambles are associated with the first PRUs.

As shown in FIG. 10, there are two ROs and two POs configured within the association pattern period. The dotted line with double arrows indicates the association between the second preambles and the second PRUs for the second type of UEs, and the solid line with double arrows indicates the association between the first preambles and the first PRUs for the first type of UEs.

In some embodiments, the first preambles can be ordered separately from the second preambles. In some embodiments, the first preambles can be ordered together with the second preambles.

In some embodiments, the first PRUs can be ordered separately from the second PRUs. In some embodiments, the first PRUs can be ordered together with the second PRUs.

Figure 11:
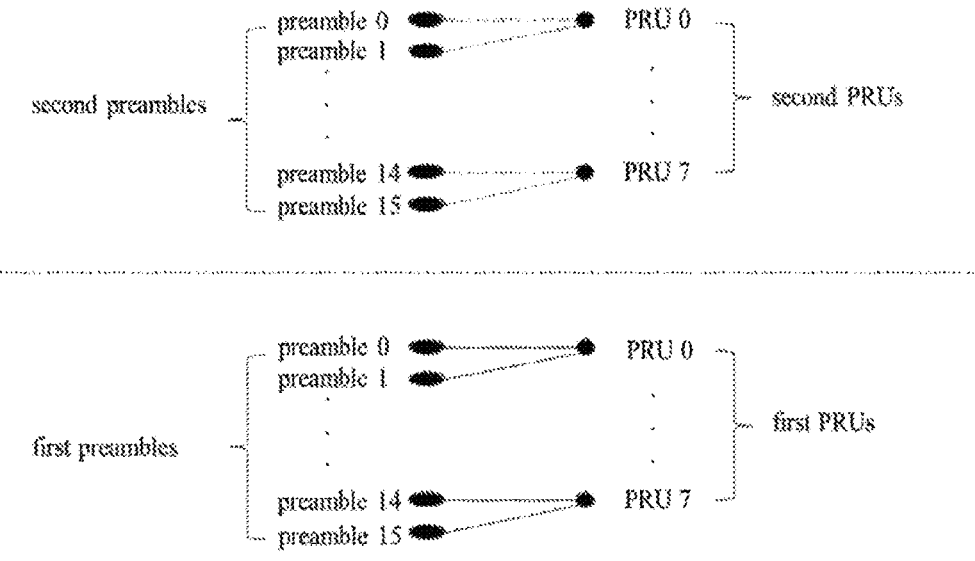
FIG. 11 illustrates an exemplary mapping for 2-step RA, in accordance with some embodiments of the present disclosure.

For example, please refer to FIG. 11, there are 8 first preambles and 8 second preambles per RO, and there are 4 first PRUs and 4 second PRUs per PO. Both of the total number $N_{preamble\_1}$ of the first preambles and the total number $N_{preamble\_2}$ of the second preambles are 16. Both of the total number $N_{pru\_1}$ of the first preambles and the total number $N_{pru\_2}$ of the second preambles are 8. These preambles and PRUs are ordered separately.

In this example shown in FIG. 11, both the mapping ratios $R_1$ and $R_2$ are set to be 2, i.e., every two preambles are associated with one PRU.

Figure 12:
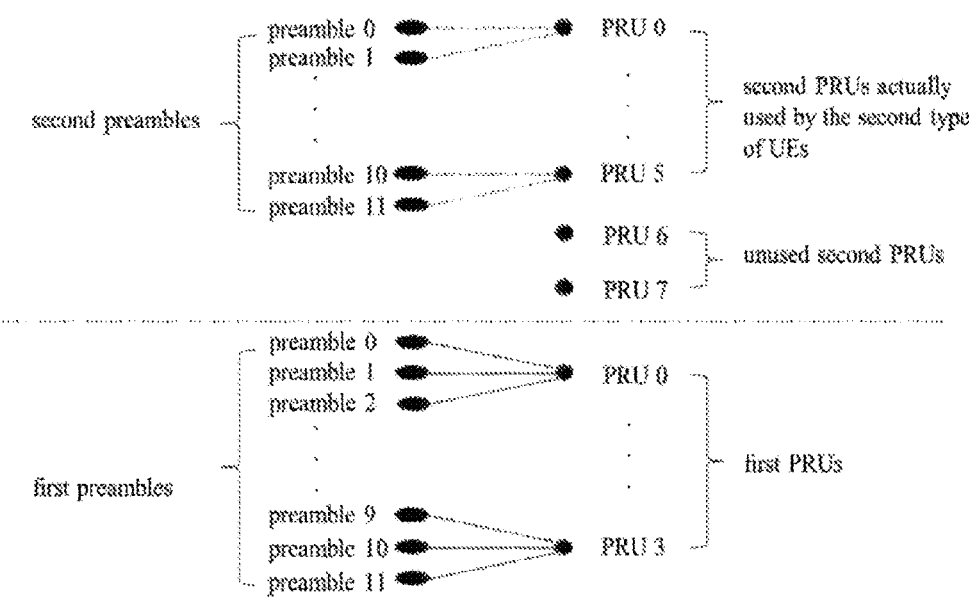
FIG. 12 illustrates an exemplary mapping for 2-step RA, in accordance with some embodiments of the present disclosure.

For example, please refer to FIG. 12, there are 6 first preambles and 6 second preambles per RO, and there are 2 first PRUs and 4 second PRUs per PO. Both of the total number $N_{preamble\_1}$ of the first preambles and the total number $N_{preamble\_2}$ of the second preambles are 12. The total number $N_{pru\_1}$ of the first type UEs is 4, and the total number $N_{pru\_2}$ of the second type UEs is 8. These preambles and PRUs are ordered separately.

In this example as shown in FIG. 12, the mapping ratios $R_1$ is set to be 3, and the mapping ratio $R_2$ is configured to be 2. The second PRUs 6 and 7 are not used by the second type of UEs, i.e., the second PRUs 6 and 7 are unused second PRUs. As the association is for associating the first preambles to the first PRUs, these unused second PRUs 6 and 7 are ignored by the first type of UEs.

Figure 13:
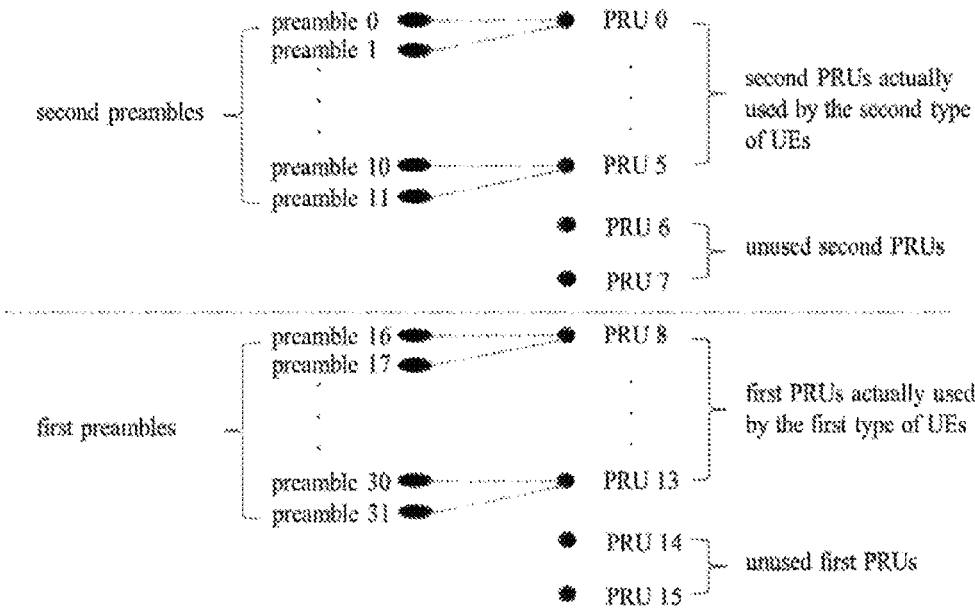
FIG. 13 illustrates an exemplary mapping for 2-step RA, in accordance with some embodiments of the present disclosure.

For example, please refer to FIG. 13, there are 6 first preambles and 6 second preambles per RO, and there are 4 first PRUs and 4 second PRUs per PO. Both of the total number $N_{preamble\_1}$ of the first preambles and the total number $N_{preamble\_2}$ of the second preambles are 12. Both of the total number $N_{pru\_1}$ of the first type UEs and the total number $N_{pru\_2}$ of the second type UEs are 8. These preambles are ordered together, and these PRUs are ordered together, wherein the offset $N_{offset}$ is set to be 4.

In this example as shown in FIG. 13, both the mapping ratios $R_1$ and the mapping ratio $R_2$ are set to be 2. The first PRUs 14 and 15 are not used by the first type of UEs, i.e., the first PRUs 14 and 15 are unused first PRUs, wherein an unused first PRU means a PRU that is configured for the first type of UEs but is not used for the first type of UEs. The second PRUs 6 and 7 are not used by the second type of UEs, i.e., the second PRUs 6 and 7 are unused second PRUs. These unused first PRUs and unused second PRUs are not used by both the first type of UEs and the second type of UEs.

Figure 14:
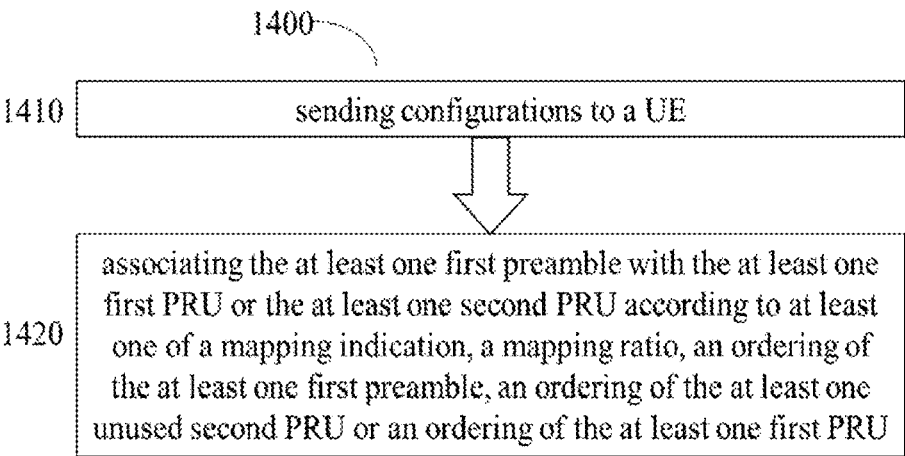
FIG. 14 illustrates an exemplary method for a 2-step RA, in accordance with some embodiments of the present disclosure.

FIG. 14 illustrates an exemplary method 1400 performed by a BS to perform a 2-step RA according to the present disclosure.

In some embodiments, the BS may be referred to as an access point, an access terminal, a base, a base unit, a macro cell, a Node-B, an evolved Node B (eNB), a generalized NodeB (gNB), a Home Node-B, a relay node, or a device, or described using other terminology used in the art.

As shown in FIG. 14, the method 1400 may at least include an operation 1410 of sending configurations to a UE, and an operation 420 for associating at least one first preamble for a first type of UEs with at least one first PRU configured for the first type of UEs or at least one unused second PRU configured for a second type of UEs according to at least one of the mapping indication, a mapping ratio, an ordering of the at least one first preamble, an ordering of the at least one unused second PRU or an ordering of the at least one first PRU; wherein, the mapping ratio is a positive integer and is for the first type of UEs. The mapping ratio is referred as $R_1$.

In some embodiments, the first type of UEs can be RedCap UEs. In some embodiments, the first type of UEs can be a specific type of RedCap UEs. In some embodiments, the second type of UEs can be legacy UEs.

In some embodiments, the association is for associating at least one first preamble with at least one unused second PRU. The unused second PRU means a PRU that is configured for the second type of UEs but is not used by the second type of UEs.

In some embodiments, for associating at least one first preamble with at least one first PRU, the BS (or the BS 220) further configures the at least one first PRU, which is separated from the at least one second PRU.

For example, for associating the first preambles with the first PRUs, the mapping ratio $R_1$ is determined by the number of the first preambles and the number of the first PRUs, i.e., each $R_1$ consecutive first preambles are associated with a first PRU. In some embodiments, the mapping ratio is determined by equation 1 previously discussed, which is reproduced as below:

$$R_1 = \text{ceil}\left(\frac{N_{preamble\_1}}{N_{pru\_1}}\right) \qquad \text{(equation 1)}$$

Wherein the number $N_{preamble\_1}$ is the total number of first preambles for the first type of UEs, and the number $N_{pru\_1}$ is the total number of the first PRUs for the first UEs.

In some embodiments, some first PRUs are not used by the first type of UEs, this is because the mapping ratio $R_1$ is a positive integer; these PRUs are referred as unused first PRUs.

For example, for associating the at least one first preamble with the at least one unused second PRU, the mapping ratio $R_1$ is determined by the number of the at least one first preamble and the number of the at least one unused second PRU. In some embodiments, the mapping ration $R_1$ is determined by equation 2 previously discussed, which is reproduced as below:

$$R_1 = \text{ceil}\left(\frac{N_{preamble\_1}}{N_{pru\_2\_unused}}\right) \qquad \text{(equation 2)}$$

Wherein the number $N_{preamble\_1}$ is the total number of first preambles for the first type of UEs, and the number $N_{pru\_2\_unused}$ is the number of unused second preambles.

In some embodiments, some unused second PRUs are not used by the first type of UEs either; this is because the mapping ratio $R_1$ is a positive integer.

If the association is for associating the first preambles with the first preambles, the mapping ration for the second type of UEs is determined as ceil (the number of the at least one second preamble/the number of the at least one second PRUs), and it is a positive integer. In some embodiments, some second PRUs are not used by the second type of UEs.

The BS may flexibly determine the number of the unused second PRUs and the mapping ratio $R_2$ for the second type of UEs considering tradeoff between the collision rate and the resource occupation, wherein the mapping ratio $R_2$ means that each $R_2$ consecutive second preambles are associated with a second PRU. The mapping ratio $R_2$ is a positive integer The BS may use the same method for ordering the preambles and the PRUs for the first type of UEs and the second type of UEs as that of the UEs mentioned previously.

In some embodiments, the BS may broadcast the at least one first preamble, the at least one second preamble, the at least one second PRU, and the at least one first PRU if existed, in the SIB1.

The BS may configure the preambles and the PRUs for the first type of UEs and the second type of UEs considering tradeoff between the collision rate and the resource occupation.

In some scenrio, the legacy UEs may be treated as the second type of UEs, and the RedCap UEs may be treated as the firs type of UEs. According to the various methods, embodiments, and examples described previously, the BS may flexibly configures the preambles and the PRUs of the legacy UEs and the RedCap UEs, so that the resource (e.g., the PRUs and/or the preambles) collision between the legacy UEs and the RedCap UEs may be decreased, and the degradation of the RA performance of the legacy UEs may be decreased. Furthermore, by using the preambles dedicated for the RedCap UEs and/or the PRUs dedicated for the RedCap UEs, the RedCap UEs may be identified by the BS earlier during a RA procedure, it is beneficial for the BS to perform access control and/or scheduling control for Red-Cap UEs earlier so as to reduce the impact to legacy UEs earlier.

The various methods, embodiments, and examples described previously can be reasonably modified and expanded, and can be reasonably combined without contradicting each other, as long as they do not violate the spirit or principle of the present invention.

In some embodiment, there may be a third type of UEs, or may be multiple types of UEs. Each type of UEs may have its own preambles. Each type of UEs may have its own PRUs or share the PRUs of other type of UEs. The various methods, embodiments, and examples described previously may be extended to the third type of UEs, or even more multiple types of UEs.

In some emobidments, the RedCap UEs may be sorted to be several typys of UEs, e.g., the RedCap UEs may be sorted to be three types of RedCap UEs, such as industrial wireless sensors, video surveillances and wearables. Each type of RedCap UEs may have its own dedicated preambles, each type of RedCap UEs may have its own dedicated PRUs or share the unused PRUs of the legacy UEs.

Figure 15:
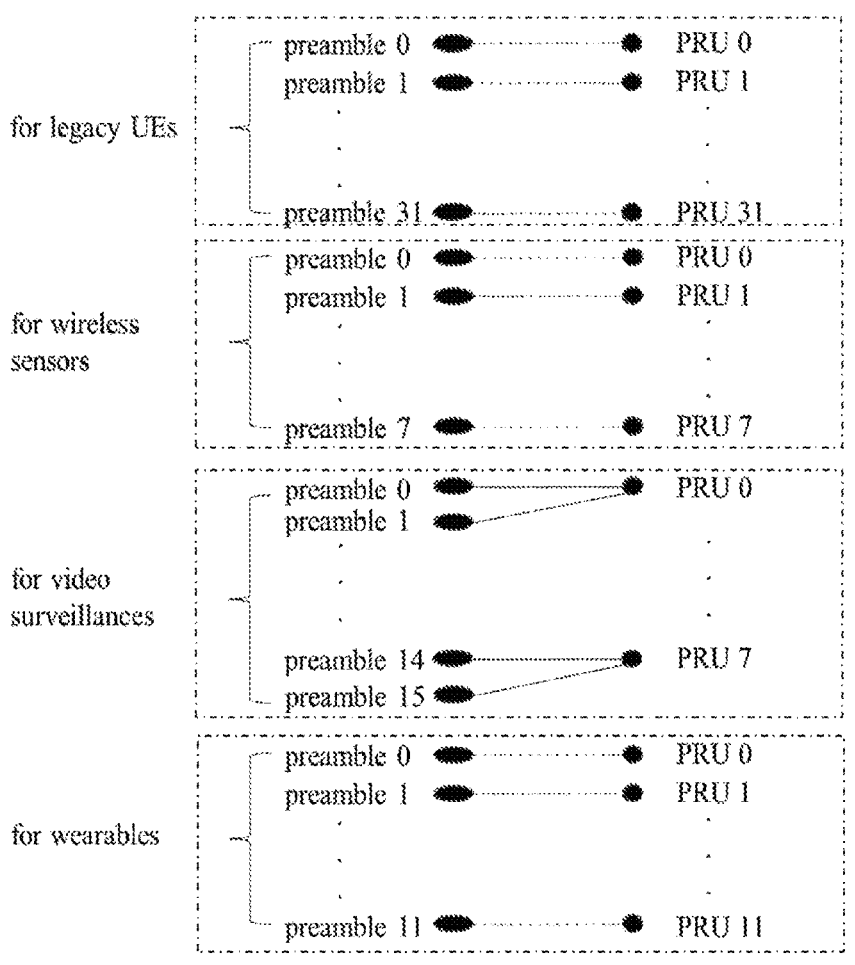
FIG. 15 illustrates an exemplary mapping for 2-step RA, in accordance with some embodiments of the present disclosure.

For example, as shown in FIG. 15, the preambles and the PRUs of each type of UEs are ordered separately. The mapping ratios for the legacy UEs, industrial wireless sensors, and wearables are 1, and the mapping ratio for the video surveillances is 2.

The advantage is that the BS may identify the type of UEs earlier during the 2-step RA according to the preambles and the PRUs, so that the BS may perform access control and/or scheduling control for RedCap UEs in order to reduce the impact to legacy UEs earlier. Therefore, the degradation of the RA performance of the legacy UEs may be decreased in advance.

Figure 16:
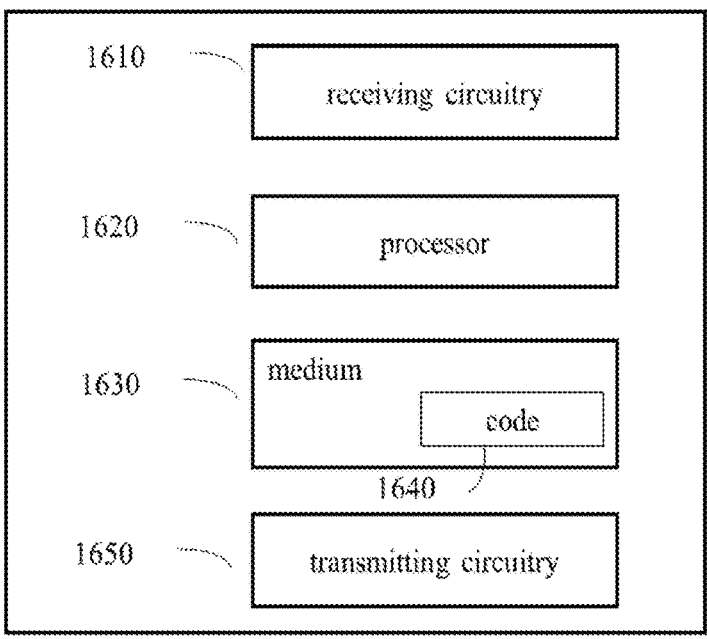
FIG. 16 illustrates an exemplary apparatus, in accordance with some embodiments of the present disclosure.

FIG. 16 illustrates an exemplary apparatus 1600 for performing an RA in an embodiment, which, for example, may be at least a part of a UE (e.g. the UE 210).

As shown in FIG. 16, the apparatus 1600 may include at least one receiving circuitry 1610, at least one processor 1620, at least one non-transitory computer-readable medium 1630 with computer-executable 1640 stored thereon, and at least one transmitting circuitry 1650. The at least one medium 1630 and the computer program code 1640 may be configured to, with the at least one processor 1620, cause the apparatus 1600 to perform at least the example methods (e.g, the methods 100 and 1400), and the embodiments described above, wherein, for example, the apparatus 1600 may be the UE in the example method 100.

Figure 17:
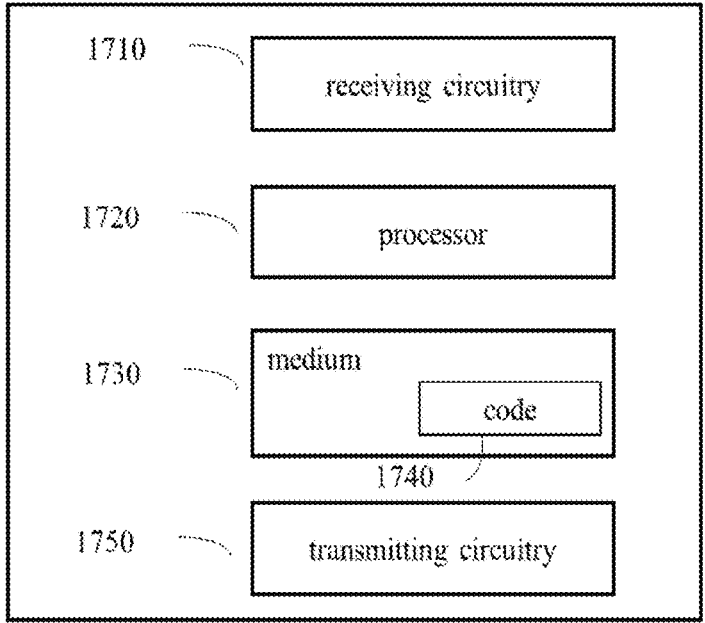
FIG. 17 illustrates an exemplary apparatus, in accordance with some embodiments of the present disclosure.

FIG. 17 illustrates an exemplary apparatus 1700 for perform an RA in an embodiment, which, for example, may be at least a part of a BS (e.g. the BS 220).

As shown in FIG. 17, the apparatus 1700 may include at least one receiving circuitry 1710, at least one processor 1720, at least one non-transitory computer-readable medium

1730 with computer program code 1740 stored thereon, and at least one transmitting circuitry 1750. The at least one medium 1730 and the computer program code 1740 may be configured to, with the at least one processor 1720, cause the apparatus 1700 to perform at least the example method 1400, and the embodiments described above.

In various example embodiments, the at least one processor 1620 or 1720 may include, but not limited to, at least one hardware processor, including at least one microprocessor such as a CPU, a portion of at least one hardware processor, and any other suitable dedicated processor such as those developed based on for example Field Programmable Gate Array (FPGA) and Application Specific Integrated Circuit (ASIC). Further, the at least one processor 1620 or 1720 may also include at least one other circuitry or element not shown in FIG. 16 or 17.

In various example embodiments, the at least one medium 1630 or 1730 may include at least one storage medium in various forms, such as a volatile memory and/or a non-volatile memory. The volatile memory may include, but not limited to, for example, an RAM, a cache, and so on. The non-volatile memory may include, but not limited to, for example, an ROM, a hard disk, a flash memory, and so on. Further, the at least medium 1630 or 1730 may include, but are not limited to, an electric, a magnetic, an optical, an electromagnetic, an infrared, or a semiconductor system, apparatus, or device or any combination of the above.

Further, in various example embodiments, the exemplary apparatus 1600 or 1700 may also include at least one other circuitry, element, and interface, for example antenna element, and the like.

In various example embodiments, the circuitries, parts, elements, and interfaces in the exemplary apparatus 1600 or 1700, including the at least one processor 1620 or 1720 and the at least one medium 1630 or 1730, may be coupled together via any suitable connections including, but not limited to, buses, crossbars, wiring and/or wireless lines, in any suitable ways, for example electrically, magnetically, optically, electromagnetically, and the like.

The methods of the present disclosure can be implemented on a programmed processor. However, controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this disclosure, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed:

1. A method for random access, comprising:
receiving configurations from a base station (BS); and
associating, based at least in part on the configurations, at least one first preamble for a first type of user equipments (UEs) with at least one first physical uplink shared channel (PUSCH) resource unit (PRU) configured for the first type of UEs or at least one unused second PRU configured for a second type of UEs according to at least one of a mapping indication, a mapping ratio, an ordering of the at least one first preamble, an ordering of the at least one unused second PRU or an ordering of the at least one first PRU;
wherein the at least one first preamble is ordered together with at least one second preamble for the second type of UEs and having an index equal to at least one index of the at least one second preamble plus an offset, or the at least one first preamble is ordered separately from the at least one second preamble; and
wherein the at least one first PRU is ordered together with at least one second PRU and having an index greater than at least one index of the at least one second PRU, or the at least one first PRU is ordered separately from the at least one second PRU.

2. The method of claim 1, wherein the mapping indication is received from the BS and indicates associating the at least one first preamble with the at least one first PRU or with at least one unused second PRU.

3. The method of claim 1, wherein the configurations include a configuration, for configuring the at least one first PRU, including a number of at least one demodulation reference signal (DMRS) symbol, at least one index of at least one code-division multiplexing (CDM) group, at least one index of at least one antenna port per CDM group, and a number of at least one DMRS sequence.

4. The method of claim 1, wherein the configurations include a configuration, for configuring the at least one first PRU, including a number of at least one demodulation reference signal (DMRS) symbol, at least one index of at least one code-division multiplexing (CDM) group, a number of antenna ports per CDM group, and a number of at least one DMRS sequence; wherein
the configuration further indicates whether at least one antenna port of the at least one first PRU is shared with the second type of UEs.

5. The method of claim 1, wherein associating the at least one first preamble with the at least one unused second PRU further comprises:
mapping the ordered at least one first preamble to the ordered at least one unused second PRU sequentially based on the mapping ratio, wherein the mapping starts from a first one of the at least one unused second PRU or from the first one of the at least one unused second PRU plus an offset.

6. The method of claim 1, wherein:
the mapping ratio is determined by a number of the at least one first preamble and a number of the at least one unused second PRU in response to associating the at least one first preamble with the at least one unused second PRU; or
the mapping ratio is determined by a number of the at least one first preamble and a number of the at least one first PRU in response to associating the at least one first preamble with the at least one first PRU.

7. An apparatus, comprising:
at least one memory; and
at least one processor coupled with the at least one memory and configured to cause the apparatus to:
receive configurations from a base station (BS); and
associate, based at least in part on the configurations, at least one first preamble for a first type of user equipments (UEs) with at least one first physical uplink shared channel (PUSCH) resource unit (PRU) configured for the first type of UEs or at least one unused second PRU configured for a second type of UEs according to at least one of a mapping indication, a mapping ratio, an ordering of the at least one first preamble, an ordering of the at least one unused second PRU or an ordering of the at least one first PRU;
wherein the at least one first preamble is ordered together with at least one second preamble for the second type of UEs and having an index equal to at least one index of the at least one second preamble plus an offset, or the at least one first preamble is ordered separately from the at least one second preamble; and
wherein the at least one first PRU is ordered together with at least one second PRU and having an index greater than at least one index of the at least one second PRU, or the at least one first PRU is ordered separately from the at least one second PRU.

8. The apparatus of claim 7, wherein the mapping indication is received from the BS and indicates associating the at least one first preamble with the at least one first PRU or with at least one unused second PRU.

9. The apparatus of claim 7, wherein the configurations include a configuration, for configuring the at least one first PRU, including a number of at least one demodulation reference signal (DMRS) symbol, at least one index of at least one code-division multiplexing (CDM) group, at least one index of at least one antenna port per CDM group, and a number of at least one DMRS sequence.

10. The apparatus of claim 7, wherein the configurations include a configuration, for configuring the at least one first PRU, including a number of at least one DMRS symbol, at least one index of at least one code-division multiplexing (CDM) group, a number of antenna ports per CDM group, and a number of at least one DMRS sequence; wherein
the configuration further indicates whether at least one antenna port of the at least one first PRU is shared with the second type of UEs.

11. The apparatus of claim 7, wherein to associate the at least one first preamble with the at least one unused second PRU is further to:
map the ordered at least one first preamble to the ordered at least one unused second PRU sequentially based on the mapping ratio, wherein the mapping starts from a first one of the at least one unused second PRU or from the first one of the at least one unused second PRU plus an offset.

12. The apparatus of claim 7, wherein:
the mapping ratio is determined by a number of the at least one first preamble and a number of the at least one unused second PRU in response to associating the at least one first preamble with the at least one unused second PRU; or
the mapping ratio is determined by a number of the at least one first preamble and a number of at least one first PRU in response to associating the at least one first preamble with the at least one first PRU.

13. An apparatus, comprising:
at least one memory; and
at least one processor coupled with the at least one memory and configured to cause the apparatus to:
send configurations to a user equipment (UE),
associate, based at least in part on the configurations, at least one first preamble for a first type of user equipments (UEs) with at least one first physical uplink shared channel (PUSCH) resource unit (PRU) configured for the first type of UEs or at least one unused second PRU configured for a second type of UEs according to at least one of a mapping indication, a mapping ratio, an ordering of the at least one first preamble, an ordering of the at least one unused second PRU or an ordering of the at least one first PRU;
wherein the at least one first preamble is ordered together with at least one second preamble for the second type of UEs and having an index equal to at least one index of the at least one second preamble plus an offset, or the at least one first preamble is ordered separately from the at least one second preamble; and
wherein the at least one first PRU is ordered together with at least one second PRU and having an index greater than at least one index of the at least one second PRU, or the at least one first PRU is ordered separately from the at least one second PRU.

14. The apparatus of claim 13, wherein the configurations include a configuration, for configuring the at least one first PRU, including a number of at least one demodulation reference signal (DMRS) symbol, at least one index of at least one code-division multiplexing (CDM) group, at least one index of at least one antenna port per CDM group, and a number of at least one DMRS sequence.

15. The apparatus of claim 13, wherein the configurations include a configuration, for configuring the at least one first PRU, including a number of at least one demodulation reference signal (DMRS) symbol, at least one index of at least one code-division multiplexing (CDM) group, a number of at least one antenna port per CDM group, and a number of at least one DMRS sequence; wherein
the configuration further indicates whether the at least one antenna port per CDM group is shared with the at least one second PRU.

16. The apparatus of claim 13, wherein to associate the at least one first preamble with the at least one unused second PRU includes the at least one unused second PRU belonging to at least one unused PUSCH occasion (PO) for the second type of UEs.

17. The apparatus of claim 13, wherein:
the mapping ratio is determined by a number of the at least one first preamble and a number of the at least one unused second PRU in response to associating the at least one first preamble with the at least one unused second PRU; or
the mapping ratio is determined by a number of the at least one first preamble and a number of at least one first PRU in response to associating the at least one first preamble with the at least one first PRU.

18. A method for random access, comprising:
sending configurations to a user equipment (UE),
associating, based at least in part on the configurations, at least one first preamble for a first type of user equipments (UEs) with at least one first physical uplink shared channel (PUSCH) resource unit (PRU) configured for the first type of UEs or at least one unused second PRU configured for a second type of UEs according to at least one of a mapping indication, a mapping ratio, an ordering of the at least one first preamble, an ordering of the at least one unused second PRU or an ordering of the at least one first PRU;
wherein the at least one first preamble is ordered together with at least one second preamble for the second type of UEs and having an index equal to at least one index of the at least one second preamble plus an offset, or the at least one first preamble is ordered separately from the at least one second preamble; and
wherein the at least one first PRU is ordered together with at least one second PRU and having an index greater than at least one index of the at least one second PRU, or the at least one first PRU is ordered separately from the at least one second PRU.

19. The method of claim 18, wherein the configurations include a configuration, for configuring the at least one first PRU, including a number of at least one demodulation reference signal (DMRS) symbol, at least one index of at least one code-division multiplexing (CDM) group, at least one index of at least one antenna port per CDM group, and a number of at least one DMRS sequence.

20. The method of claim 18, wherein the configurations include a configuration, for configuring the at least one first PRU, including a number of at least one demodulation reference signal (DMRS) symbol, at least one index of at least one code-division multiplexing (CDM) group, a number of at least one antenna port per CDM group, and a number of at least one DMRS sequence; wherein
the configuration further indicates whether the at least one antenna port per CDM group is shared with the at least one second PRU.

* * * * *